Patented Oct. 9, 1928.

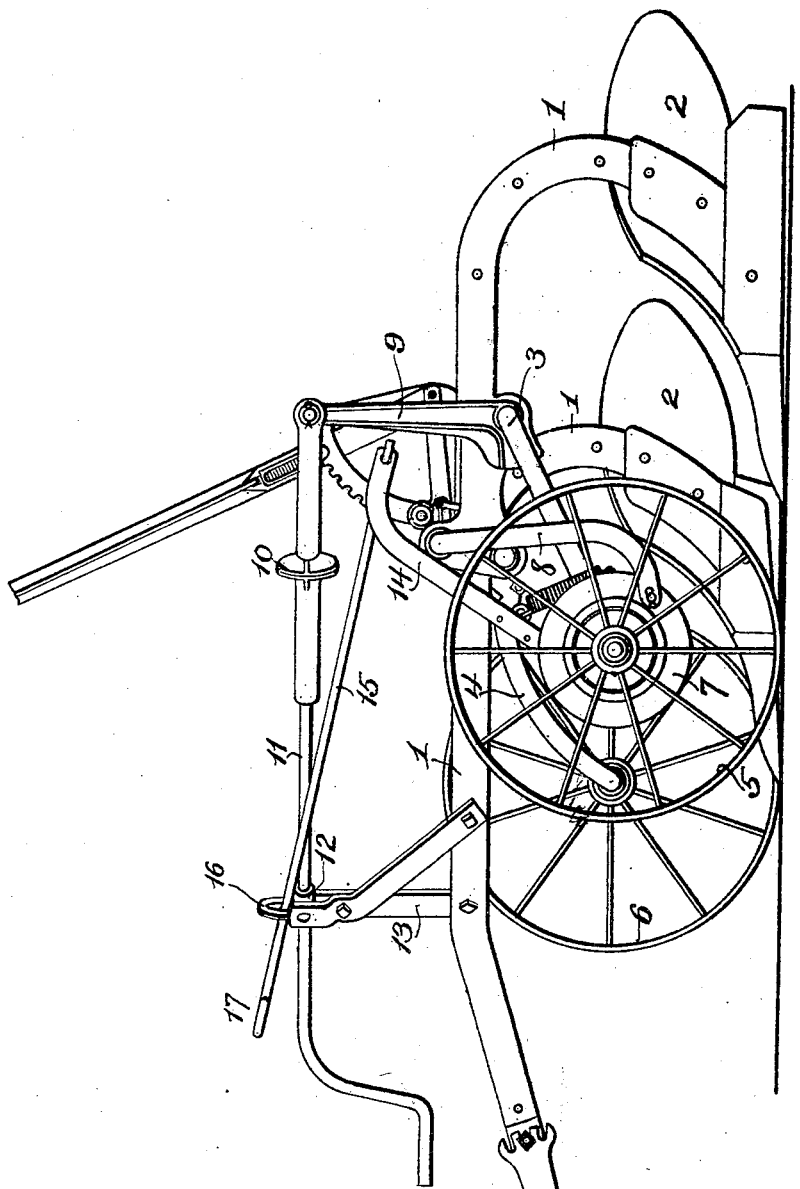

1,686,545

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

POWER-LIFT PLOW.

Application filed June 8, 1923. Serial No. 644,177.

This invention relates to improvements in power lift plows and more particularly to means for controlling the operation of the clutch devices whereby the lifting connections are coupled to a carrying wheel of a plow,—one object of my present invention being to provide improved means for permitting the manual operation of the control member of a power lift mechanism when such mechanism is associated with a crank axle of a wheeled plow, and to effectually overcome the objections and annoyances incident to the use of a cord such as commonly employed for operating the control lever of lifting mechanism, such cord being liable to be blown about by the wind and to become caught in lugs of the tractor wheels, thus rendering it difficult for the operator to quickly grasp and operate it.

With this and other objects in view, the invention consists in certain novel features of construction and combinations of parts as hereinafter set forth and pointed out in the claim.

The accompanying drawing is a view in side elevation of a wheeled power lift plow structure showing an embodiment of my invention.

The frame of the plow structure comprises a plurality of beams 1 suitably spaced and braced and having standard portions with which plow bases 2 are connected. Suitable bearings are provided for the accommodation of crank axles 3 and 4 and these axles are adapted for connection with carrying wheels,—such as a land wheel 5 and a furrow wheel 6.

Power lift mechanism 7 is associated with the land wheel crank axle and land wheel and is connected through the medium of a lifting arm 8 with the plow frame. Lifting mechanism such as shown and described in patent granted to me and Cameron H. Gemberling on the 3rd day of June 1924 and designated by No. 1,496,441.

The plow is provided with depth adjusting means such as shown and described in application granted to Herman E. Altgelt August 5, 1924 and designated by No. 1,503,779. This mechanism includes an arm 9 secured to one of the crank axles and screw adjusting means 10 connected with said arm,—said screw adjusting means including a manually operable shaft 11 mounted to turn in a sleeve or knuckle 12 supported by a standard 13 secured to the plow frame.

The control lever 14 of the power lift mechanism is pivotally supported by a part secured to the axle as disclosed in Patent No. 1,496,441 above mentioned, and has connected with its upper end portion, a rod 15. This rod passes forwardly and freely through an eye or guide 16 supported upon and by the sleeve or knuckle 12. The forwardly projecting portion of the rod 15 is provided with a loop or hand hold 17 which will be disposed within convenient reach of the operator riding upon a tractor with which the plow structure is connected.

With the use of my improvement, a rigid, manually operable member is loosely connected at its rear end with the control lever of the power lift mechanism and is prevented from lateral displacement by the loop or guide 16. The handle end of the rod is always in position to be grasped by the operator and the inconveniences and annoyances incident to the use of a cord or rope heretofore commonly employed for operating the control lever of the lift mechanism will be effectually obviated.

Having fully described my invention what I claim as new and desire to secure by Letters-Patent, is:

In a power lift plow, the combination of crank axles, ground wheels on the axles, a plow frame carrying earth-working means and provided with bearings for the axles, power lift means associated with one of the wheels and connected to the frame for raising the latter, a control lever cooperable directly with said power lift means and supported independently of said frame whereby the latter will be capable of vertical movement independently of said control lever, an operating rod connected with said control lever and extending forwardly above the frame, a guide for said rod, and means on the frame adjacent the front end thereof for supporting said guide whereby the operating rod will be maintained in position to be manipulated from a position in front of the plow.

In testimony whereof, I have signed this specification.

RUDOLPH J. ALTGELT.